United States Patent [19]

Carlson

[11] 4,194,098
[45] Mar. 18, 1980

[54] LINEMAN'S HAND TEST SET

[75] Inventor: Alan J. Carlson, Syosset, N.Y.

[73] Assignee: Metro-Tel Corp., Syosset, N.Y.

[21] Appl. No.: 914,869

[22] Filed: Jun. 12, 1978

[51] Int. Cl.² .................................................. H04M 3/22
[52] U.S. Cl. .................................. 179/175; 179/90 K
[58] Field of Search ................. 179/175, 103, 90 K, 179/175.1 R, 175.11

[56] References Cited

U.S. PATENT DOCUMENTS 3,778,556  12/1973  Mees et al. .......................... 179/90 K
3,792,205  2/1974   O'Dea ................................... 179/175
4,119,810  10/1978  Marin et al. ........................ 179/90 K Primary Examiner—Thomas A. Robinson
Attorney, Agent, or Firm—Holland, Armstrong, Wilkie & Previto

[57] ABSTRACT

The present invention comprises a lineman's hand test set which will simultaneously generate both tone impulses for tone dialing as well as dial pulses for rotary dialing, the rotary dialing or the tone dialing being inhibited depending on the type of telephone the lineman is working with.

20 Claims, 5 Drawing Figures

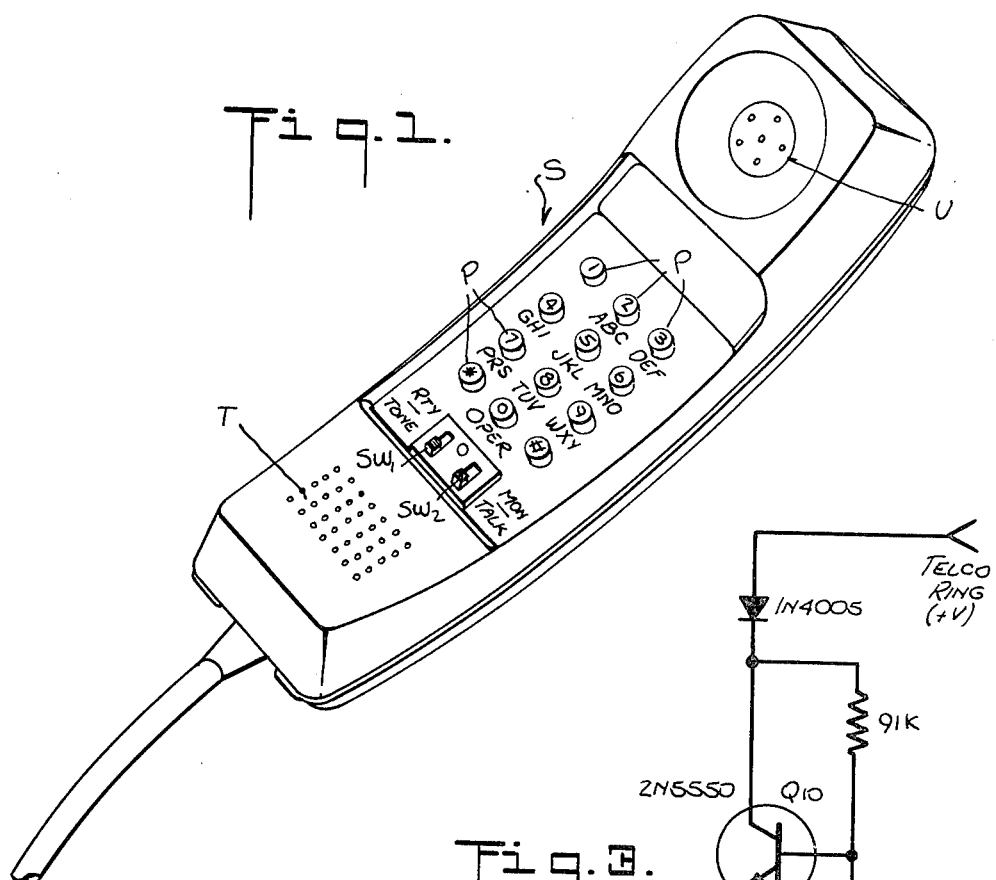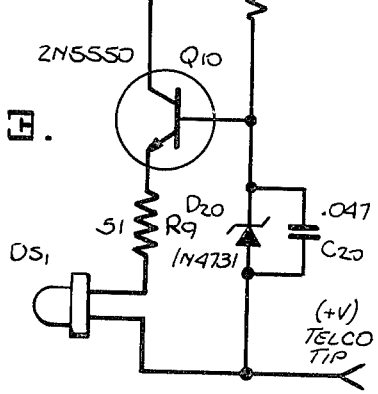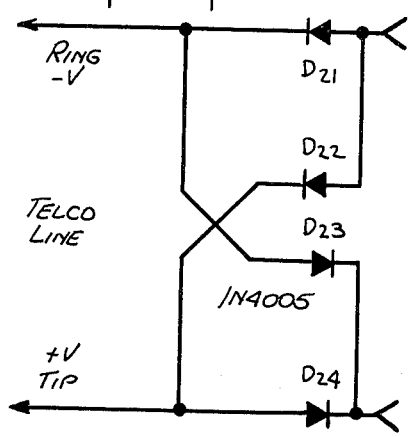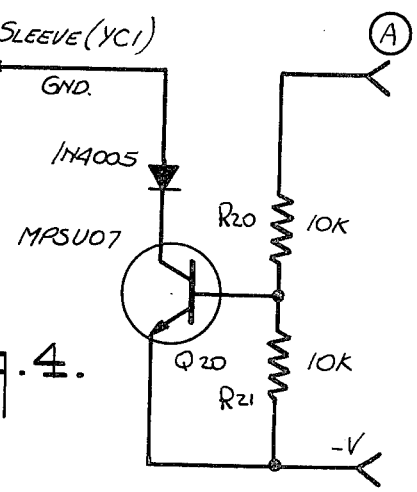

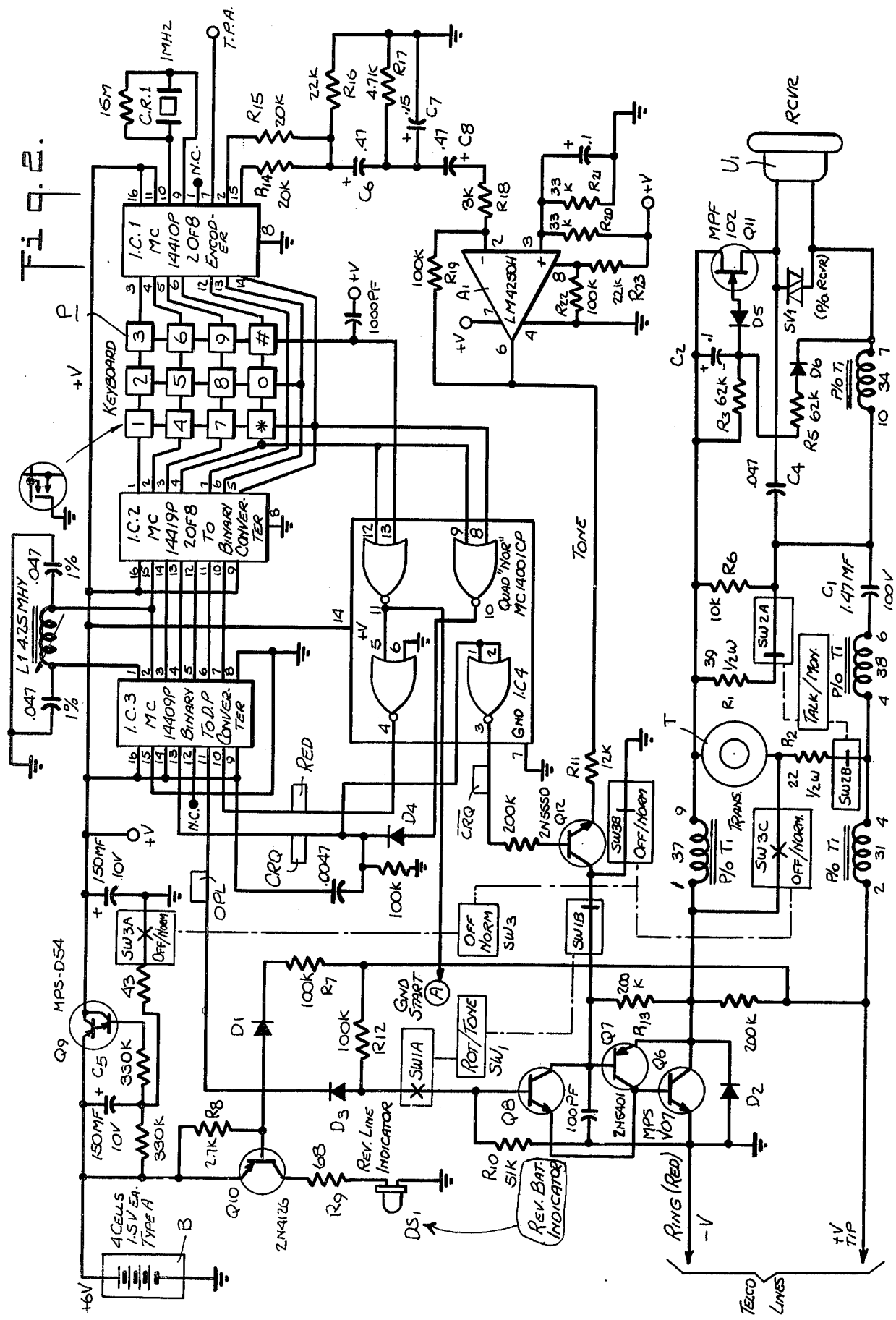

LINEMAN'S HAND TEST SET

DESCRIPTION

The present invention is directed to an improved lineman's and central office telephone test hand set.

More particularly, the invention provides an improved lineman's hand set which may be used for both rotary dial pulses and push button dial tones. With the growing popularity of push button telephone dialing, it has been difficult for a test lineman to test both rotary dial pulses and push button tone dialing. It is often necessary for a lineman to have two sets of test equipment, one for rotary dialing and the other for push button tone dialing.

The present invention provides an improved test lineman's hand set which has a touch tone pad which may be used both for rotary dialing and push button tone dialing.

Another object of the present invention is the provision of an improved lineman's test set which may be used either for monitoring or for normal telephone operation.

Another object of the present invention is the provision of an improved lineman's test set which provides for a line polarity indicator.

Another object of the present invention is the provision of an improved lineman's test set which provides for an incoming ring indication.

Another object of the present invention is the provision of an improved lineman's test set which provides for an automatic number re-dialing in the rotary mode of the last number dialed.

Another object of the present invention is the provision of an improved hand set in which plug in-line connections are provided for both outside or central office operation.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings forming a part of the specification, wherein:

FIG. 1 is a perspective view of the hand set which is used in connection with the present invention.

FIG. 2 is a schematic diagrammatic view of the circuitry of the present invention.

FIG. 3 is a schematic view showing a modification which comprises a reverse battery indicator.

FIG. 4 shows a schematic view which permits use of a ground start line.

FIG. 5 is a schematic view showing a modification which includes a polarity guard.

Referring more particularly to FIG. 1, the hand test set of the present invention comprises the usual hand set S comprising a transmitter T at one end and a receiver U at the other end. Digital push buttons P are provided between the two ends with a rotary/tone switch SW1 and a monitor/talk switch SW2 being provided. It will be seen that with this tool, the lineman can use a single hand set for both rotary dialing pulses and push button dialing tones and for both monitoring or talking.

In general, the present invention, as shown in FIG. 2, comprises the keyboard P which is connected to digital generator IC1 and to rotary generator IC3 through a converter IC2. When any of the buttons of the keyboard P are depressed, tones are simultaneously generated in IC1 and in IC3. Through the circuit which will be described in greater detail hereinafter, the tones, whether they are digital from IC1 or rotary from IC3, are used to trigger transistor switch circuit Q6 and Q7 which may be a Darlington switch, in order to transmit those signals to the telephone network.

Switch circuit Q6 and Q7 is powered either by transistor Q12, when digital tones are desired, or transistor Q8, when rotary tones are desired. When a digital tone dialing is desired, Q8 is both mechanically turned off and electrically turned off and Q12 is physically connected to Q6 and Q7 so that impulses from IC1 affect Q6 and Q7. When rotary tone dialing is desired, Q6 and Q7 is physically disconnected from Q12 and Q8 is physically and electrically connected to IC3 so that the rotary pulses of IC3 are used to pass current to Q6 and Q7 to convey rotary pulse information to the telephone lines. It will thus be seen that in either event, the keyboard P will activate both rotary and digital signals with one being inhibited.

The components of a standard telephone network are shown in FIG. 2 and comprise a transmitter T and a receiver U. Diode assembly SV1, resistors R1 and R2 (39 ohm and 22 ohm respectively), condenser C1 (1.5 MFD) and the four windings 37, 31, 38 and 34 of the transformer T1 are also included as standard parts and, in accordance with the present invention, the components are arranged in a manner similar to the arrangement in a telephone network.

A cut-off transistor Q11 (MPF 102) for the receiver is arranged to cut-off the signals to the earpiece U1 of the receiver U, when a pulse appears across the TIP and RING terminals. This occurs either when there is a break or interruption in the current from the telephone line or when the transistor assembly Q6-Q7 turns off the current through the entire network. The current supplied to the network from the telephone line will be of correct polarity because of the reverse polarity detector Q10. When current is interrupted as set forth above, a positive potential is created on the gate of transistor Q11 through resistors R3 (62K ohm) and R5 (62K ohm) which will turn Q11 off thus silencing the earpiece.

This will in turn lower but not remove entirely audible dialing clicks, which may irritate or possibly damage the user's ear. Since the level of clicks is approximately 20 dBM during dialing the user can hear the dialing to assure the user of the functional operation of the unit.

Voice frequency filtering capacitor C2 (0.1 MFD) will decrease distortion of voice frequencies to U1 by placing a D.C. voltage on the gate of Q11 during normal operation. Capacitor C4 (0.047) removes R.F. generation of diode D5 biasing on the gate of Q11 by being placed in parallel with Q11. Resistor R6 (10k) in parallel with earpiece U1 limits transient voltages across Q11 when it is in the off condition.

The time constants in C2 and R3 are set to stop the receiver U1 for approximately 25 MS which is ample for make and break times during outgoing dialing.

The Talk/Monitor switch SW2 comprises two segments SW2A and SW2B which are used to remove the current path and to raise the input impedance of the network. The segment SW2B, which is in series with the transmitter T, breaks the D.C. current path, while the segment SW2A, which is in series with R1, changes the input impedance by breaking the low side of the differential hybrid circuit of the transformer. This input impedance is raised from about 1150 ohms to approximately 10K ohms.

The off-normal switch SW3 has three segments SW3A, SW3B and SW3C. The segment SW3C which is across winding 37 and pin 1 of the transformer T1 shorts the differential hybrid circuit and transmitter so that when tone dialing, transistor Q6 connects with the telephone lines through a low impedance. Also during tone dialing, transformer T1 is shorted so that extraneous signals are not placed on the line from audible sources. The diode D2 assures proper monitoring in both reversed and normal polarities of use.

Reverse polarity indicator, DS1, turns on when a negative potential appears on the TIP side of the telephone lines by turning on Q10 through diode D1 and resistors R7 (100K ohm) and R8 (2.7K ohm). When 30 volts or more appears on R7 transistor Q10 will turn on supplying the battery voltage from battery B through R9 (68 ohm) to the reverse polarity indicator DS1.

The battery B is filtered and lowered in impedance by the capacitor C5 which is in parallel with it. The capacitor C5 is in series with the segment SW3A of the off-/norm. switch SW3 to provide a 1 minute time constant for transistor Q9. Q9 is turned on whenever any button of the keyboard is depressed, supplying 6 volts from battery B to the tone and rotary generators.

Emitter follower circuit Q6 and Q7 forms a medium high current switch capable of on-off switching when under control of transistor Q8 and rotary/tone switch segment SW1 or an emitter follower when controlled by the off/norm switch SW3 and rotary/tone switch SW1 biased by the operational amplifier.

When tone push button dialing the rotary/tone switch SW1 is placed in the tone position and as shown in the drawing segment SW1A is open and SW1B is closed so that a ground is placed on the base of Q7 through segment SW3B (shown closed) of the off/norm switch SW3. Q8 base is grounded through a resistor R10 (51K) and is off. When any button of the keyboard P is depressed, the tone generator IC1 and rotary generator IC2 and IC3 will simultaneously obtain power and simultaneously generate both rotary and tone dialing corresponding with the button pushed.

Tones are fed to the TONE lead through a resistor R11 with a bias voltage of about 3 volts. Since the contacts of the off/norm switch segment SW3C are open, the tone signal will pass to the base of Q7. In turn, its emitter will follow the A.C. portion, riding on a bias of about 3 volts of the tone signal. The tone signal is then impressed to a low impedance network, through T1, into the telephone lines. The dial pulse generator signal from IC3 on line OPL will go to an open segment SW1A of the rotary/tone switch SW1 and not affect the tone output.

When rotary dialing, the rotary/tone switch segment SW1 in the rotary position, with segment SW1A closed and SW1B open, dial pulses occur at IC2 and IC3 as well as IC1 when any button of the keyboard P is pushed. Since SW1B segment is open the output of IC1 has no effect on Q7. A corresponding pulse appears on OPL input lead through IC3 and to transistor Q8 through closed segment SW1A and D3. Transistor Q8 which was on, due to the resistor R12 (100K) on its base, turns on and off. Q8 then supplies a ground or an open circuit to Q7. Q7 has a base resistor R13 of 200K ohms so that when Q8 is off, Q7 will also turn off. This removes the base voltage from Q6, which breaks the current flow through the network to the telephone lines. Q7 and Q6 will follow the pulse placed on Q8, making current pulses as in normal outgoing dialing. The grounded off/norm switch segment SW3B in the TONE input lead does not appear to the base of Q7 because the rotary/tone switch segment SW1B is open.

In either position of the rotary/tone switch, when power to the tone generator IC1 or rotary generator IC2 and IC3 is removed due to the 1 minute timer circuit, the circuit of Q7-Q6 will remain on. If the rotary/tone switch SW1 is in the tone position (SW1B segment closed and SW1A open) ground is placed to the base of Q7, keeping Q6 and Q7 on. If the rotary/tone switch SW1 is in the rotary position (SW1B segment open and SW1A closed) a positive voltage is placed on Q8 and Q8 will turn on, resulting in Q6 and Q7 turning on. This maintains current flow in the network during conversation after dialing has occurred. Depression of the keyboard makes two connections simultaneously to ground forming a 2 of 8 combination to supply generators IC1 and IC2 (MC14410 and MC14419) with coded information. The IC1 is a 2 to 8 tone encoder which provides an output that is digitally synthesized and filtered. The tones are amplified by an amplifier A1 and sent to the output stage Q6 and Q7. The IC1 has two outputs, a low tone group and high tone group. These tones are generated simultaneously from pins 2 and 15 and are crystal controlled by a 1 megahertz oscillator CR1.

The filter circuit is comprised of the summing of resistors R14 and R15 (20K ohm each) and D.C. referenced to ground in resistor R16 (22K ohm). Capacitors C6 (0.47 MFD) and C7 (0.15 MFD) with resistors R17 and R16 comprises a 2 stage R.C. filter.

Coupling capacitor C8 (0.47 MFD) and resistor R18 (3K ohm) with resistor R19 (100K ohm) of the operational amplifier A1 sets the gain, which may be a gain of approximately 53. The signal enters the inverting input on pin 2 of amplifier A1. A reference voltage is generated through a resistor divider biasing network R20 and R21 (33K each) and applied to pin 3 of amplifier A1. Program currents resistors R22 and R23 (100K and 22K) set the current of the operating amperage as low as possible and maintain a low output impedance from pin 6 of amplifier A1. The output is then sent to the transistors Q6 and Q7.

The IC2 converts 2 of 8 push button codes from the keyboard to binary rotary codes for use by the IC3 (MC 14409). Its input oscillator L1 on pin 15 is set to a frequency of about 15.96 kilohertz. This derives proper timing for elimination of contact bounce and gives sequence timing for input to output control.

IC3 converts binary information to outpulsing dial rotary signals, which are fed to output switch segment SW1A and transistors Q6, Q7 and Q8 through D3 on the OPL line. Timing of make/break ratios are controlled by the 15.96 kilohertz L.C. oscillator and via programming pins.

Provision for number re-dial and auto dialing for up to 16 numbers are contained in memory circuits of the IC3. Re-dial is selected through the gated circuit IC4 which comprises a plurality of NOR gates and includes a logic inverter. The last number entered into the keyboard P may be re-dialed when the # button is depressed. This action also prevents a new number from being dialed.

Recall occurs when a * button is depressed by placing a fixed D.C. voltage on Q8 from the OPL line through pin 4 of IC4. This also resets memory registers of IC3 and allows a new number to be dialed in the IC3. Depression of the * button also disconnects Q12 to prevent any impulses from A1 to reach Q6-Q7.

As indicated above, when it is desired to operate with both modes, the * button is first depressed to reset all the memories and to interrupt current to Q12 and Q8 through IC4. When dialing occurs by depressing the keys of the keyboard, Q8 has been physically and electrically disconnected and Q12 has been physically connected to Q6 and Q7. Tones from IC1 are first filtered and then amplified and sent through transistor Q12 to effect Q6 and Q7 which then feeds the tones to the telephone network.

When it is desired to use rotary dialing, the switches are reset so that Q12 is physically disconnected from Q6 and Q7 and Q8 is physically and electrically connected to IC3. Signals from the keyboard converted by IC2 are sent through the OPL line to Q8 which in turn will activate Q6 and Q7 to provide rotary dialing to the telephone network.

Several modifications or additions may be used with the invention.

In FIG. 3, the circuit may be modified in order to eliminate the battery and use a line power for the LED. In this event, the Q10 as well as the LED is impressed across the telephone lines as indicated. Included are zener D 20 and capacitor C 20.

In FIG. 4, there is shown a circuit which can be used when the telephone lines include a ground start line. The circuit is impressed across the ground start line A from pin 11 and the ring line of the telephone network. The circuit includes a transistor A 20 and resistors R20 and R21.

FIG. 5 shows another modification in the form of a bridge rectifier circuit which is placed across the telephone network to assure proper polarity. The bridge circuit includes diodes D 21, D 22, D 23 and D 24.

As many and varied modifications of the subject matter of this invention will become apparent to those skilled in the art from the detailed description given hereinabove, it will be understood that the present invention is limited only as provided in the claims appended hereto.

The embodiments of the invention in which an exclusive property or privilege is claimed are defined as follows:

1. A lineman's hand test set for generating digital and rotary tones to a telephone network comprising a single tone generating mechanism, a rotary tone encoder, a digital tone encoder, each encoder being operatively connected to the tone generating mechanism, a switch circuit operatively connected to each of said encoders and to the telephone network, generation of tones by said tone generator mechanism pulsing signals to each encoder, control means interposed between each encoder and said switch circuit, the control means being disabled from its particular encoder depending on whether rotary tones or digital tones are desired whereby either rotary tones or digital tones are passed by the undisabled control means to the switch circuit to the telephone network.

2. A lineman's hand test set as claimed in claim 1 wherein said tone generating mechanism includes a push button keyboard.

3. A lineman's hand test set as claimed in claim 2 wherein said control means comprises a control transistor operatively connected to the rotary tone generator and a second control transistor operatively connected to said digital tone generator.

4. A lineman's hand test set as claimed in claim 3 wherein switch means are provided to disconnect said rotary tone control transistor from said switch circuit.

5. A lineman's hand test set as claimed in claim 4 wherein means are provided to disconnect said digital tone control transistor from said switch means.

6. A lineman's hand test set as claimed in claim 5 wherein switch means common to said two control transistors are provided to disconnect both.

7. A lineman's hand test set as claimed in claim 6 wherein the rotary tone control transistor is in circuit with the digital tone control transistor to electrically disable the digital tone transistor.

8. A lineman's hand test set as claimed in claim 7 wherein said switch means comprise a darlington pair.

9. A lineman's hand test set as claimed in claim 8 wherein the rotary tone transistor is connected to the rotary tone generator through an amplifying circuit.

10. A lineman's hand test set as claimed in claim 9 wherein said amplifying circuit is connected to a filter circuit.

11. A lineman's hand test set as claimed in claim 10 wherein said amplifying circuit is connected to a biasing circuit.

12. A lineman's hand test set as claimed in claim 11 wherein the rotary control transistor is connected to a * button of the keyboard through a gated circuit whereby depression of said * keyboard disables both control transistors.

13. A lineman's hand test set as claimed in claim 12 wherein a reverse polarity detector is provided for said telephone network, voice filtering capacitors are associated with said receiver and a diode is provided for the cut-off transistor.

14. A lineman's hand test set as claimed in claim 13 wherein a resistor is in parallel with the earpiece to limit transient voltages across the cut-off transistor.

15. A lineman's hand test set as claimed in claim 14 wherein a talk/monitor switch is provided to break the current with the transmitter and to change the input impedance.

16. A lineman's hand test set as claimed in claim 15 wherein an off/normal switch is provided to short the hybrid circuit and the transmitter so that the switch means connects with the network at lower impedance.

17. A lineman's hand test set as claimed in claim 16 wherein an LED is provided on the reverse polarity indicator and said LED is connected to the network through a diode and a pair of resistors so as to permit voltage to be supplied to the LED.

18. A lineman's hand test set as claimed in claim 17 wherein said LED is operated by line power and includes a zener and a capacitor.

19. A lineman's hand test set as claimed in claim 17 wherein a ground start circuit is included which includes a transistor and a pair of resistors.

20. A lineman's hand test set as claimed in claim 17 wherein a bridge rectifier circuit is included to assure proper polarity.

* * * * *